United States Patent [19]

Wienecke

[11] Patent Number: 5,017,385

[45] Date of Patent: May 21, 1991

[54] CHEWING GUM

[75] Inventor: Horst P. Wienecke, Gross-Gerau, Fed. Rep. of Germany

[73] Assignee: The Procter & Gamble Company, Cincinnati, Ohio

[21] Appl. No.: 438,556

[22] Filed: Nov. 17, 1989

[30] Foreign Application Priority Data

Nov. 25, 1988 [GB] United Kingdom ................ 8827683
Jun. 21, 1989 [GB] United Kingdom ................ 8914238

[51] Int. Cl.$^5$ .......................... A23G 3/00; A23G 3/30
[52] U.S. Cl. ........................................ 426/5; 426/103; 426/249; 426/660
[58] Field of Search ........................................ 426/3–6, 426/103, 89, 660, 249

[56] References Cited

U.S. PATENT DOCUMENTS

| | | | |
|---|---|---|---|
| D. 146,541 | 1/1874 | Moore | 426/5 |
| 1,771,981 | 7/1930 | Mustin | 426/5 |
| 1,771,982 | 7/1930 | Mustin | 426/5 |
| 2,700,012 | 1/1955 | Merckel et al. | 426/3 |
| 3,062,662 | 11/1962 | McDonald | 426/5 |
| 3,085,048 | 4/1963 | Bush | 426/3 |
| 3,205,075 | 9/1965 | Heggie et al. | 426/5 |
| 3,208,405 | 9/1965 | Beer | 426/3 |
| 3,262,784 | 7/1966 | Bucher | 426/5 |
| 3,477,394 | 11/1969 | Tidwell | 426/5 |
| 3,857,965 | 12/1974 | Ream | 426/3 |
| 4,000,321 | 12/1976 | Mochizuki | 426/5 |
| 4,150,161 | 4/1979 | Rudolph | 426/3 |
| 4,254,149 | 3/1981 | Rudolph | 426/5 |
| 4,271,199 | 6/1981 | Cherukuri et al. | 426/5 |

FOREIGN PATENT DOCUMENTS 0126570 11/1984 European Pat. Off. .
0253040 1/1988 European Pat. Off. .
2016895 10/1979 United Kingdom .

*Primary Examiner*—Jeanette Hunter
*Attorney, Agent, or Firm*—D. C. Mohl; J. D. Schaeffer; R. C. Witte

[57] ABSTRACT

A sugar-free or sugar-based chewing gum candy product having improved organoleptic properties and which comprises a matrix of confectionary ingredients having distributed therein multiple discrete regions of a chewing gum composition together with multiple discrete regions of a hardboiled candy composition. The chewing gum candy product displays novel organoleptic properties together with enhanced flavor and sweetness impact.

14 Claims, No Drawings

CHEWING GUM

This invention to chewing gum. In particular, it relates to a sugar-free or sugar-based chewing gum candy product having novel and improved organoleptic properties. In addition, the invention relates to a chewing gum candy product which can be conveniently prepared by extrusion.

Chewing gum candy products having high sweetness levels and which include conventional candy components, are well known in the confectionary field. Such products are marketed, among other things, for their novelty appeal.

For example, EP-A-0253040 relates to a chewing gum candy product prepared by mixing and melted chewing gum with a cooked hard candy syrup to form a substantially single phase continuous plastic chewing gum candy mass which, on cooling, forms a hard candy matrix suitable for scoring, cutting and grinding.

Other patents which relate to the formation of single phase or homogeneous chewing gum candy products include US-A-2460695, Japanese publication 53026-355, US-A-71,199 and US-A-3857965. In general terms, single-phase or homogeneous candy products of these types are characterized by having a uniform textural cross section and low flavor impact.

So-called centre-filled chewing gum products are also well-known in the confectionary arts. The centre-filling variously takes the form of a liquid filling, as disclosed for example in GB-A-2016895, a dry powder filling as disclosed in EP-A-0126570, or a soft gum filling as disclosed in EP-A-0058496. Centre-filled chewing gums only provide textural diversity at the macroscopic level, however. By contrast the chewing gum candy products of the present invention combine at the microscopic level, the "chewines" of a conventional chewing gum product with the "crunchiness" of a conventional hardboiled candy product to provide a crisp "honey-combed" chewing gum having novel organoleptic properties together with enhanced flavor and sweetness impact.

Although sugar-free chewing gum products are well-known in the confectionary arts (see for example GB-A-2053651), extrusion of sugar-free gums can present substantial difficulties in as much as the sugar-free gum tends to harden and crumble before extrusion can be completed. It is therefore one feature of the present invention that a sugar-free chewing gum candy product is amenable to and indeed is preferably prepared by an extrusion-type process.

Another valuable feature of the chewing gum candy product of the invention is that the candy product provides an excellent matrix for incorporating ingredients such as oral health agents, high impact aromatic flavouring agents etc. with improved release of the active ingredient within the oral cavity.

A further feature of the chewing gum candy product of the invention is that the candy product provides an excellent vehicle for sequential release of active ingredients within the oral cavity, and is therefore valuable in circumstances where the active ingredients are mutually incompatible or are designed to interact only within the oral cavity itself, for instance, as part of a dental anti-caries or remineralization system.

Thus, according to the present invention, there is provided a chewing gum candy product having improved organoleptic properties and which comprises a matrix of confectionary ingredients having distributed therein multiple discrete regions of a chewing gum composition together with multiple discrete regions of a hardboiled candy composition.

In preferred embodiments, the matrix has a laminate structure comprising multiple alternate layers of the chewing gum composition and of the hardboiled candy composition. Preferably, the matrix is additionally enveloped within a coating of a second hardboiled candy composition, the first and second hardboiled candy compositions being either the same or different to one another.

The present invention also provides a process for making the chewing gum candy product comprising the steps of forming a rope of the first hardboiled candy composition and having a centre-filling of the chewing gum composition, the temperature of the rope being no more than about 55° C. in case of sugar-free composition and no more than about 85° C. for sugar-based composition accumulating the rope and drawing the accumulated rope through compacting means to form a skein of centre-filled ropes to form a laminated matrix, optionally enveloping the laminated matrix within a layer of the second hardboiled candy composition, and forming the laminated and optionally enveloped matrix into the final chewing gum candy product.

The chewing gum composition generally comprises one or more natural or synthetic elastomers and can be supplemented by conventional chewing gum ingredients such as one or more solvents, plasticizers, fillers, flavouring agents, colouring agents and/or sweetening agents.

Elastomers which are suitable for use herein include substances of vegetable origin such as chicle, jelutong, gutta percha, guayle and crown gum. Synthetic elastomers such as butadiene-styrene copolymers, isobutylene-isoprene copolymers, polyethylene, polyisobutylene, polyvinylacetate and mixtures thereof are also useful. The elastomer generally comprises from about 14 % to 50 % by weight, preferably from about 20 % to about 30 % by weight of the chewing gum composition.

The chewing gum composition can contain elastomer solvents to aid in softening the polymer component. Such elastomer solvents can include methyl, glycerol or pentaerythritol esters of rosins or modified rosins, such as hydrogenated, dimerized or polymerized rosins or mixtures thereof. Examples of elastomer solvents suitable for use herein include pentaerythritol ester of partially hydrogenated, dimerized or polymerized rosins or mixtures thereof. Examples of elastomer solvents suitable for use herein include pentaerythritol ester of partially hydrogenated wood rosin, pentaerthritol ester of wood rosin, glycerol ester of partially dimerized rosin, glycerol ester of polymerized rosin, glycerol ester of tall oil rosin, glycerol ester of wood rosin, and partially hydrogenated wood rosin, and partially hydrogenated methyl ester of rosin and mixtures thereof. Terpene resins, including polyterpene and mixtures thereof are also useful. The solvent can be employed in an amount ranging from about 10% to about 75% and preferably about 15 % to about 50 % by weight of the chewing gum composition.

A variety of traditional ingredients used as plasticizers, softeners or emulsifiers such as lanolin, lecithin, glyceryl monostearate, stearic acid, sodium stearate, potassium stearate, glyceryl triacetate, triacetin, glycerin and the like as well as natural waxes, petroleum waxes, paraffin waxes and microcrystalline waxes, can also be incorporated into the chewing gum composition to obtain a variety of desirable textures and consistency properties. These additional materials are generally employed in amounts of up to about 30 % by weight, preferably about 1 % to about 25 % by weight and more preferably from about 3 % to about 7 % by weight of the final chewing gum composition.

The chewing gum composition can additionally include conventional colouring agents such as titanium dioxide, and fillers such as dicalcium phosphate, aluminum hydroxide, alumina, aluminum silicates, talc, calcium carbonate, cellulose and combinations thereof. The chewing gum composition can also include flavoring, colouring and/or sweetening agents (both artificial and sugar as well as sugar alcohol types) as more fully described below in relation to the hardboiled candy composition.

The first and second hardboiled candy compositions, which may be the same or different but which are preferably the same, typically comprise one or more sugar alcohols and can be supplemented by conventional candy ingredients such as one or more flavoring agents, colouring agents and/or artificial sweetening agents. The sugar-free compositions are substantially free of saccharose components such as sucrose, fructose, etc. while the sugar-based composition contains natural sugars such as sucrose, glucose, etc. Suitable sugar alcohols herein include sorbitol mannitol, xylitol, maltitol and hydrogenated starch and glucose syrups produced by catalytic hydrogenation of carbohydrate syrups to the point where all carbohydrate end groups are reduced to alcohols. A suitable hydrogenated starch hydrolysate includes from about 6 % to 10 % sorbitol, from about 25 % to about 55% maltitol and from 20 % to about 40 % hydrogenated higher saccharides. A typical hydrogenated starch hydrolysate is Lycasin (RTM). The hardboiled candy composition can contain up to about 95 % natural sugar and/or sugar alcohol, especially maltitol, sorbitol, mixtures of sorbitol and maltitol, mannitol or other sugar alcohols in a weight ratio of from about 9.5:0.5 to 7.5:2.5. Sugar alcohols can also be included in the chewing gum composition in levels up to about 75 %, preferably from about 10 % to 50 % by weight thereof. In this case, the preferred sugar alcohol is xylitol.

Colouring, flavoring and/or natural and artificial sweetening agents can also be included either as part of the hardboiled candy composition or the chewing gum composition.

Flavoring agents well-known in the chewing gum and candy art can be added to the chewing gum candy compositions of the invention. These flavoring agents can be chosen from synthetic flavor oils and/or oils derived from plants, leaves, flowers, fruits and so forth, and combinations thereof. Representative flavor oils include: spearmint oil, cinnamon oil, oil of wintergreen (methylsalicylate), eucalyptus and peppermint oils. Also useful are artificial, natural or synthetic fruit flavors such as citrus oil including lemon, orange, grape, lime and grapefruit, and fruit essences including apple, strawberry, cherry, blackcurrent, pineapple and so forth. The flavors may be supplemented by menthol where appropriate.

The amount of flavoring agents and/or flavor enhancers employed is normally a matter of preference subject to such factors as flavor type, base type and strength desired. In general, amounts of about 0.05 % to about 3.0 % by weight of the final composition are useable with amounts of about 0.3 % to about 1.5 % being preferred and about 0.7 % to about 1.2 % being more preferred.

Similarly, artificial sweeteners well-known in the art can be added to the compositions of the invention. Suitable artificial sweeteners encompass water-soluble sweeteners such as the soluble saccharin salts, i.e., sodium or calcium saccharin salts, cyclamate salts, such as the sodium salt and the like, and the free acid form of saccharin; dipeptide based sweeteners such as L-aspartyl-L-phenylalanine methyl ester and materials described in US-A-3,392,131; dihydrochalcone; glycyrrhizin; *Stevia rebaudiana* (Stevioside); and the synthetic sweetener 3,6-dihydro-6-methyl-1,1,2,3-oxathiazin-4-one-2,2-dioxide, particularly the potassium (Acesulfame-K), sodium and calcium salts thereof as described in DE-A-2,001,017.

Artificial sweeteners are generally used in amounts of from about 0.005 % to about 5 % and most preferably from about 0.05 % to about 1% by weight of the final composition.

In preferred embodiments, the chewing gum candy product of the invention comprises the chewing gum composition and the first hardboiled candy composition in a weight ratio of from about 5:1 to about 1:5, preferably from about 2:1 to about 1:2. Preferably, the chewing gum candy product comprises from about 12 % to about 60 % by weight of the chewing gum composition, from about 12 % to about 60 % of the first hardboiled candy composition and from about 5 % to about 40 % of the second hardboiled candy composition.

The chewing gum candy product of the present invention can be used as a delivery system for an active ingredient which is preferably incorporated in either the first or second hardboiled candy composition. The active ingredient is preferably selected from oral health agents, high impact aromatic flavoring agents, mineral supplements, vitamins, antibacterial agents, and anti-tussive agents. Other suitable bio-effect agents include analgesics, antipyretics, antiarrhythmics, ion exchange resins, appetite suppressants, anti-inflammatory substances, coronary dilators, cerebral dilators, peripheral vasodilators, anti-infectives, psychotropics, antimanics, stimulants, antihistamines, laxatives, decongestants, gastro-intestinal sedatives, antidiarrheal preparations, antianginal drugs, vasodilators, anti-hypertensive drugs, vasoconstrictors and migrane treatments, antibiotics, tranquilizers, antipsychotics, antitumor drugs, anticoagulants and antitrombotic drugs, hypnotics, sedatives, anti-emetics and antithyroid preparations, diuretics, antispasmodics, uterine relaxants, nutritional additives, antiobesity drugs, anabolic drugs, erythropoietic drugs, antiasthmatics, expectorants, mucolytics, antiuricemic drugs and mixtures thereof.

If the chewing gum is sugar-free, the oral health agent takes the form of a fluoride which is added in levels of from about 0.001 % to about 1 % by weight for anti-caries purposes. It is a feature of the present invention that the chewing gum candy product can provide substantially improved release of fluoride in comparison with that provided by conventional chewing gum products. Preferred fluorides are sodium fluoride, stannous fluoride, indium fluoride and sodium monofluorophosphate. Norris et al, US-A-2,946,738, and Widder et al US-A-3,678,154 disclose such salts as well as others.

Other suitable oral health agents suitable for use herein include quaternary ammonium antimicrobial and antiplaque compounds such as dodecyl trimethyl ammonium bromide, tetradecyl pyrdinium chloride, tetradecyl ethyl pyridinium chloride, dodecyl dimethyl (2-phenoxyethyl)ammonium bromide, benzyl dimethylstearyl ammonium chloride, cetyl pyridinium chloride, quaternized 5-amino-1,3-bis(2-ethyl-hexyl)-5-methyl T-M hexahydropyrimidine, benzethonium chloride and substituted quanidines such as chlorhexidine; and anionic calculus inhibitors such as the soluble pyrophosphate salts, soluble polycarboxylic salts (eg polyacrylic acid) and polyphosphates among others.

An additional feature of the chewing gum candy product of the invention is that the product can provide an excellent vehicle for sequential release of active ingredients and is therefore valuable in circumstances where the active ingredients are mutually incompatible or are only designed to interact within the oral cavity itself. In this aspect, the mutually incompatible ingredients are separately incorporated within the chewing gum composition and the first or second candy composition, the release characteristics of the chewing gum and candy compositions being such that the candy composition active ingredient is released into the oral cavity prior to release of the chewing gum composition active ingredient. This is particularly valuable in the case of products designed for anti-caries or dental remineralization purposes wherein, for example, the chewing gum composition comprises a source of calcium ions such as calcium carbonate, and the first of second hardboiled candy composition comprises a source of fluoride and/or a source of phosphate ions, eg sodium monofluorophosphate.

The compositions herein are preferably prepared by an extrusion-type lamination process using a machine as generally described in US-A-4,648,316, Ruffinatti. A preferred process for making the chewing gum candy product comprises forming a rope of the first hardboiled candy composition and having a centre-filling of the chewing gum composition, the temperature of the rope being no more than about 55 ° C. in case of sugar-free compositions and no more than about 85 ° C. in case of sugar-based compositions, accumulating the rope and drawing the accumulated rope through compacting means to form a skein of centre-filled ropes, folding or repeatedly folding the skein of centre-filled ropes to form a laminated matrix, optionally enveloping the laminated matrix within a layer of the second hardboiled candy composition, and forming the laminated and optionally enveloped matrix into the final chewing gum candy product.

The texture of the final chewing gum candy product can be controlled at the laminate matrix forming stage by repeatedly folding the skein of centre-filled ropes to either a greater or lesser extent as appropriate. Where the skein of centre-filled ropes is folded or repeatedly folded no more than about 4 times, the final product is a crisp chewable candy product having immediate "bite-through" chewing characteristics. Where, on the other hand, the skein of centre-filled ropes is repeatedly folded at least 10 times, the final product is a hard candy product which develops "bite-through" chewing characteristics only after a delay period within the oral cavity. An intermediate number of foldings provides, correspondingly, an intermediate level of "bite-through" characteristics.

It should be noted that the requirement that the centre-filled rope have a temperature of no more than about 55 ° C. or about 85 ° C., respectively, is important from the viewpoint of achieving a well defined laminate structure in the final chewing gum candy product and is the consequence of the inherent physical characteristics of the chewing gum composition.

The invention is illustrated by the following non-limiting examples:

EXAMPLE 1

A sugar-free gun composition is prepared having the following

| Gum base | 58.5 |
|---|---|
| Xylitol (60%) | 6.7 |
| Xylitol powder | 30.0 |
| Glycerol | 4.0 |
| Peppermint oil | 0.8 |
| | 100.0 |

In the above, the gum base consists of styrene butadiene elastomer, polyvinylacetate resin, a rosin ester, microcrystalline wax and calcium carbonate. The chewing gum composition is prepared by warming the gum base to about 50 ° C. in a kneader, adding the glycerol, xylitol solution and peppermint oil, all pre-warmed to about 50 ° C., to the kneader, adding the xylitol powder and mixing until a homogeneous mass is achieved.

A hardboiled sugar-free candy composition is then prepared by boiling maltitol syrup (about 75 % total solids) at a temperature of about 165° C. until the weight of syrup is reduced by about one-third. The syrup is then cooled to a temperature of about 105°–110 ° C. and a mixture of peppermint oil and menthol is added thereto at a level of about 0.8 % by weight of the candy composition.

The chewing gum composition (550 g) and a proportion (800 g) of the sugar-free candy composition are then laminated according to the process described above at a rope temperature of about 50 ° C., the skein of ropes being repeatedly folded about 4 times at the laminate matrix forming stage, and the laminated sheet being enveloped within a 2-3 mm layer formed by the remainder (400 g) of the hardboiled sugarfree candy composition. Finally, the laminated matrix is passed to a sizing unit where the laminated matrix is formed into a rope and the rope is formed into individual chewing gum candy units having an indio vidual weight of about 4.2 g.

EXAMPLE 2

A sugar-based chewing gum composition is prepared having the following formulation:

| Gum base | 57.0 |
|---|---|
| Sugar, powdered | 32.0 |
| Glycerol | 5.2 |
| Glucose syrup | 5.0 |
| Peppermint oil | 0.8 |
| | 100.0 |

In the above, the gum base consists of styrene butadiene elastomer, polyvinyl acetate resin, a rosin ester, microcrystalline wax and calcium carbonate. The chewing gum composition is prepared by warming the gum base to about 85 ° C. in a kneader, adding the glycerol, glucose syrup and peppermint oil, all pre-warmed to about 85 ° C., then adding the sugar powder and mixing until a homogeneous mass is achieved.

A hardboiled candy composition is then prepared by boiling sugar and glucose syrup in a ratio 60:40 on wet base at a temperature of about 40°-145° C. After passing a vacuum, the candy composition is then cooled to about 118° C. and a mixture of peppermint oil and menthol is added thereto at a level of about 0.8 % by weight of the candy composition.

The chewing gum composition (550 g) and a proportion (800 g) of the candy composition are then laminated according to the process described above at a rope temperature of about 85° C., the skein of ropes being repeatedly folded at the laminate matrix forming stage, and the laminated sheet being enveloped within a 2-3 mm layer formed by the remainder (400 g) of the hardboiled candy composition. Finally, the laminated matrix is passed to a sizing unit where the laminated matrix is formed into a rope and the rope is formed into individual chewing gum candy units having an individual weight of about 4.2 g.

The chewing gum candy products combine the "chewiness" of a conventional chewing gum product with the "crunchiness" of a conventional hardboiled candy product and provide a crisp "honey-combed" chewing gum having novel organoleptic properties together with enchanced flavor and sweetness impact.

What is claimed is:

1. A chewing gum candy product having improved organoleptic properties and which comprises a matrix of confectionary ingredients having distributed therein multiple discrete regions of a chewing gum composition together with multiple discrete regions of a hardboiled candy composition.

2. A product according to claim 1 wherein the matrix has a laminate structure comprising multiple alternate layers of the chewing gum composition and of the hardboiled candy composition.

3. A product according to claim 2 wherein the matrix is additionally enveloped within a coating of a second hardboiled candy composition, said first and second hardboiled candy compositions being either the same or different to one another.

4. A product according to claim 3 wherein the chewing gum composition comprises one or more natural or synthetic elastomers optionally together with one or more solvents, plasticizers, fillers, flavoring agents, colouring agents and/or sweetening agents.

5. A product according to claim 4 wherein the first and second hardboiled candy compositions comprises one or more sugar alcohols, optionally together with one or more flavoring agents, colouring agents and/or natural or artificial sweetening agents.

6. A product according to claim 5 wherein the chewing gum composition and the first hardboiled candy composition are in a weight ratio of from about 5:1 to about 1:5, preferably from about 2:1 to about 1:2.

7. A product according to claim 6 comprising from about 12% to about 60% by weight of chewing gum composition, from about 12% to about 60% of first hardboiled candy composition and from about 5% to about 40% of second hardboiled candy composition.

8. A product according to claim 7 wherein the first and/or second hardboiled candy composition additionally comprises an active ingredient selected from oral health agents, high impact aromatic flavoring agents, mineral supplements, vitamins, antibacterial agents, anti-tussive agents and the like.

9. A product according to claim 8 wherein the active ingredient is a fluoride anticaries agent.

10. A candy product according to claim 9 adapted for sequential release of active ingredients and which comprises a combination of mutually-incompatible biologically-active ingredients separately incorporated within the chewing gum composition and the first or second hardboiled candy composition.

11. A product according to claim 10 adapted for anticaries or remineralization treatment of dental enamel wherein the chewing gum composition comprises a source of calcium ions and the first or second hardboiled is a sugar-free candy composition comprising a source of fluoride ions and/or a source of phosphate ions.

12. A process for making a chewing gum candy product according to claim 1 comprising the steps of forming a rope of the first hardboiled candy composition and having a centre-filling of the chewing gum composition, the temperature of the rope being no more than about 55° C. in case of sugar-free compositions and no more than about 85° C. in case of sugar-based compositions, accumulating the rope and drawing the accumulated rope through compacting means to form a skein of centre-filled ropes, folding or repeatedly folding the skein of centre-filled ropes to form a laminated matrix, optionally enveloping the laminated matrix within a layer of the second hardboiled candy composition, and forming the laminated and optionally enveloped matrix into the final chewing gum candy product.

13. A process according to claim 12 wherein the skein of centrefilled ropes is folded or repeatedly folded no more than 4 times, whereby the final product is a crisp chewable candy product having immediate "bite-through" chewing characteristics.

14. A process according to claim 12 wherein the skein of centrefilled ropes is repeatedly folded at least 10 times, whereby the final product is a hard candy product which develops "bite-through" chewing characteristics only after a delay period within the oral cavity.

* * * * *